(12) United States Patent
Coulson et al.

(10) Patent No.: US 11,530,678 B2
(45) Date of Patent: Dec. 20, 2022

(54) WICKET GATE FOR A HYDRAULIC TURBINE OR PUMP

(71) Applicant: Voith Patent GmbH, Heidenheim (DE)

(72) Inventors: Stuart Coulson, Seven Valleys, PA (US); Jason Foust, Jacobus, PA (US); Jesse Zoll, Mountville, PA (US); Steven McHale, Harrisburg, PA (US); Jianbo Jiang, York, PA (US); Brandon Harmer, York, PA (US)

(73) Assignee: Voith Patent GmbH, Heidenheim (DE)

( * ) Notice: Subject to any disclaimer, the term of this patent is extended or adjusted under 35 U.S.C. 154(b) by 14 days.

(21) Appl. No.: 17/040,303

(22) PCT Filed: Feb. 28, 2019

(86) PCT No.: PCT/EP2019/054955
§ 371 (c)(1),
(2) Date: Sep. 22, 2020

(87) PCT Pub. No.: WO2019/179743
PCT Pub. Date: Sep. 26, 2019

(65) Prior Publication Data
US 2021/0088022 A1    Mar. 25, 2021

Related U.S. Application Data

(60) Provisional application No. 62/697,736, filed on Jul. 13, 2018, provisional application No. 62/646,589, filed on Mar. 22, 2018.

(51) Int. Cl.
*F03B 3/18* (2006.01)
*F03B 11/00* (2006.01)
*F03B 3/12* (2006.01)

(52) U.S. Cl.
CPC .............. *F03B 3/183* (2013.01); *F03B 3/121* (2013.01); *F03B 11/002* (2013.01);
(Continued)

(58) Field of Classification Search
CPC .... F03B 3/183; F03B 11/002; F05B 2260/96; F05B 2220/64
See application file for complete search history.

(56) References Cited

U.S. PATENT DOCUMENTS 1,750,400 A * 3/1930 Gibbs .................... F03B 3/183
                                                          415/163
2,803,428 A    8/1957 Garnett
6,544,001 B2 * 4/2003 Dailey ..................... B22C 9/10
                                                          415/115

FOREIGN PATENT DOCUMENTS

FR          1075070 A      10/1954
JP          S5965985 U      5/1984
WO          9510705 A1      4/1995

* cited by examiner

*Primary Examiner* — Topaz L. Elliott
*Assistant Examiner* — Michael K. Reitz
(74) *Attorney, Agent, or Firm* — Laurence A. Greenberg; Werner H. Stemer; Ralph E. Locher

(57) ABSTRACT

A wicket gate for a hydraulic turbine or pump contains a blade being defined by a pressure surface, an oppositely facing suction surface, a leading edge and a spaced apart trailing edge, a first trunnion, a second trunnion, an air inlet aperture, an air passage and at least one air outlet aperture. The profile of the suctions side surface of the blade along a cross section through a point P1 and a point P2 is concave. Whereas point P1 is located on the suction side surface of the trailing edge where an air outlet aperture is located and point P2 is spaced apart from point P1 by less than 10% of (Continued)

the wicket gate length D and point P2 is located upstream of point P1 on a line perpendicular to the trailing edge starting at point P1.

4 Claims, 4 Drawing Sheets

(52) U.S. Cl.
CPC ...... *F05B 2260/96* (2013.01); *F05D 2240/24* (2013.01); *F05D 2240/30* (2013.01)

WICKET GATE FOR A HYDRAULIC TURBINE OR PUMP

BACKGROUND OF THE INVENTION

Field of the Invention

The present invention relates generally to hydroelectric turbine or pump installations.

As is well known in prior art, the damaging effects of cavitation in hydraulic machines can be reduced by the introduction of air. For example, U.S. Pat. No. 2,803,428 to W. R. Garnett discloses a hydraulic machine with wicket gates whereas air is introduced through the wicket gates into the fluid passage ahead of the runner. Another positive effect of the introduction of air is the reduction of vibration and noise, which can occur especially at low flows.

SUMMARY OF THE INVENTION

The objective of the present invention is to increase the amount of air introduced through a wicket gate over the amount of air achieved by a state of the art wicket gate for a given air input source.

The present invention provides a wicket gate of a hydraulic turbine or pump which is capable of introducing high amounts of air.

In some embodiments the invention will even function with an air input source at atmospheric pressure, avoiding the expense of an air compressor.

The problem is solved by a wicket gate according to the independent claim. Other favorable implementations of the invention are disclosed in the dependent claims.

The inventors have recognized that the problem can be solved by altering the geometry near the trailing edge of the wicket gate to create a local drop in pressure on the trailing edge surface.

The invention will hereinafter be described in conjunction with the appended drawings.

DETAILED DESCRIPTION OF THE INVENTION

Figure 1:
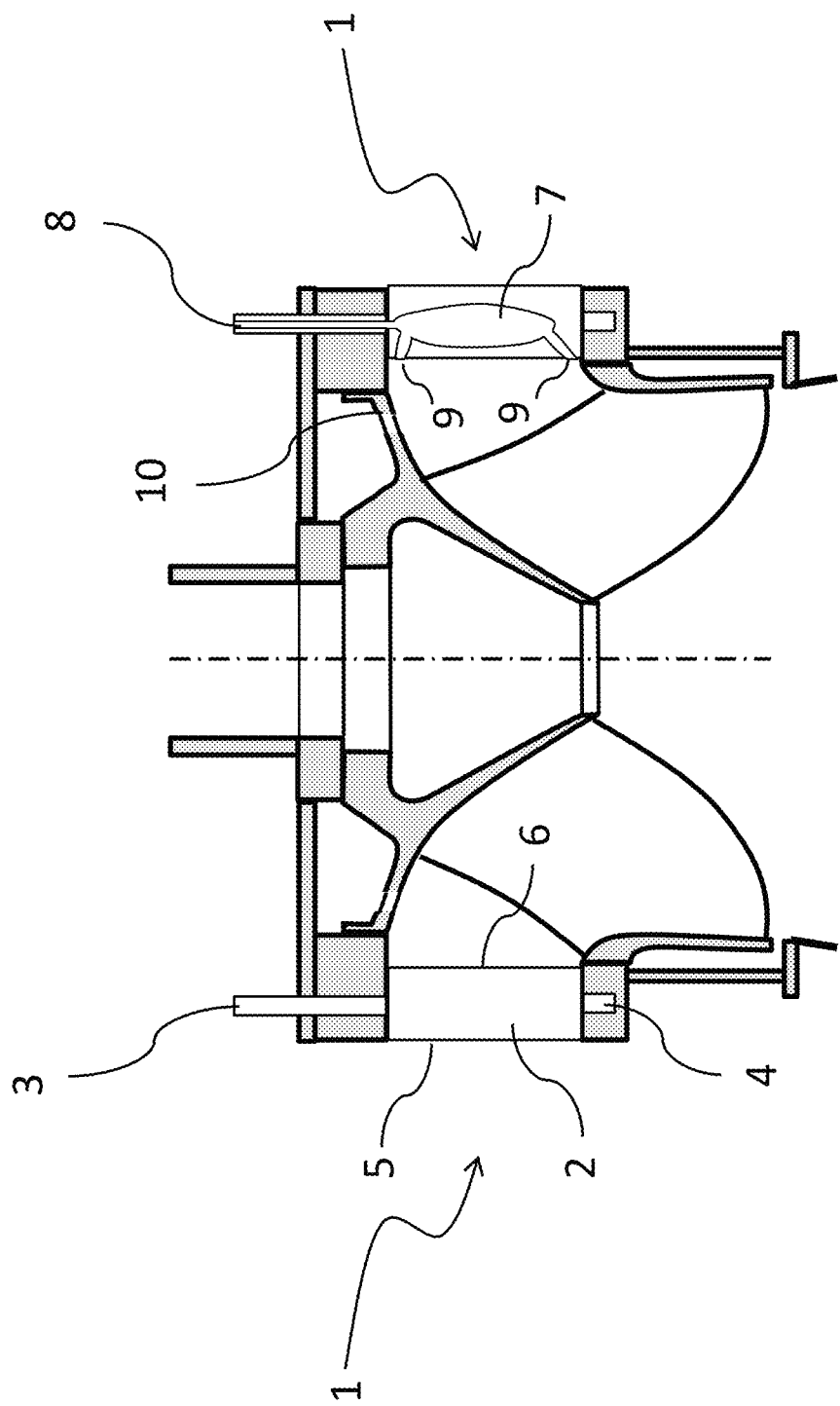
FIG. 1 is a cross-sectional view of a hydraulic machine comprising a wicket gate according the present invention.

FIG. 1 displays schematically a cross-sectional view of a hydraulic machine. The hydraulic machine comprises wicket gates. FIG. 1 displays two of them designated as 1. Each wicket gate 1 comprises a blade 2, a first trunnion 3 and a second trunnion 4. The blade 2 comprises a leading edge 5 and a trailing edge 6. The wicket gate 1 on the right side of FIG. 1 comprises an air passage 7, an air inlet aperture 8 and two air outlet apertures each designated as 9. The air inlet aperture 8 is located at first trunnion 3 and the air outlet apertures are located on the trailing edge 6 of the wicket gate blade 2. The distance between leading edge 5 and trailing edge 6 is known as the wicket gate length (L).

During the operation of the hydraulic machine, air enters the air inlet aperture 8 flows through the air passage 7, passes the air outlet aperture 9, and enters thus the working fluid of the hydraulic machine.

Figure 2:
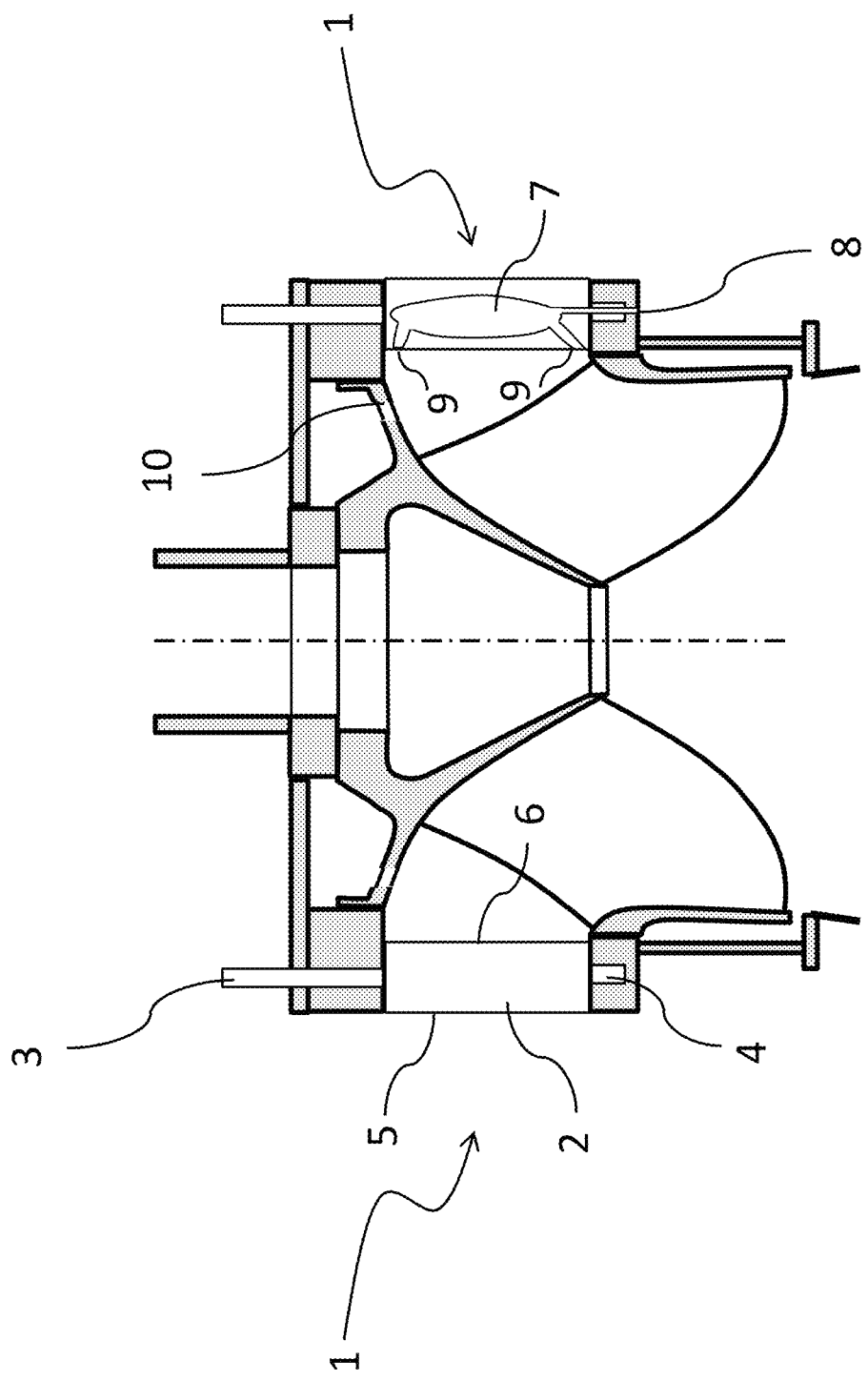
FIG. 2 is a cross-sectional view of a hydraulic machine comprising a wicket gate according the present invention.

FIG. 2 displays schematically a cross-sectional view of a hydraulic machine. The only difference to FIG. 1 is that the air inlet aperture 8 is located at the second trunnion 4.

In FIGS. 1 and 2, one of the air outlet apertures 9 is located in the region of the upper end of the wicket gate blade 2, viz. in the region of the wicket gate blade 2 adjoining the first trunnion 3. Air admission in this region is favorable for mitigation of vibration and noise, which are caused primarily by vortices that initiate near the runner crown, which is designated by 10. The other air outlet aperture 9 is located in the region of the lower end of the wicket gate blade 2, viz. in the region of the wicket gate blade 2 adjoining the second trunnion 4. Air admission in this region is favorable for mitigation of cavitation. The number and location of air outlet apertures 9 is of course not restricted to the number shown in embodiments in FIGS. 1 and 2. Of course, the present invention will also work with only one air outlet aperture 9.

FIGS. 1 and 2 display a hydraulic machine having a vertical axis of rotation. Accordingly, the wicket gates are orientated vertically too. Of course, the invention is not limited to wicket gates for hydraulic machines having a vertical axis of rotation.

Figure 3:
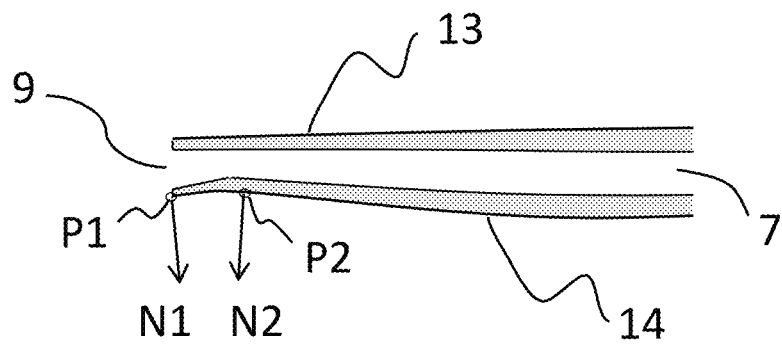
FIG. 3 is a cross-sectional view of a wicket gate blade according to a first embodiment of the present invention.

FIG. 3 is a cross-sectional view of a wicket gate blade according to a first embodiment of the present invention. FIG. 3 displays the portion of the wicket gate blade near the trailing edge in a region where an air outlet aperture 9 is located. The pressure side surface of the wicket gate blade is designated as 13 and the suction side surface of the wicket gate blade is designated as 14. The point designated as P1 is located on the suction side surface 14 of the trailing edge 4. The point designated as P2 is located on the suction side surface 14 of the wicket gate blade. The distance between point P1 and point P2 is less than 10% of the wicket gate length L measured in the direction perpendicular to the trailing edge. The arrows are indicating the normal vectors on the suction side surface 14 of the wicket gate blade, whereas the normal vector designated as N1 is located at point P1 and the normal vector designated as N2 is located at point P2. According to the prior art the profile of the suction side surface 14 between the points P1 and P2 is straight or slightly convex meaning that the orientations of the normal vectors N1 and N2 are the same (or differing only very little) or are pointing away from each other. According to the present invention, the profile of the suction side surface 14 between the points P1 and P2 is concave.

During operation of the wicket gate, the working fluid of the hydraulic machine is flowing from the leading edge towards the trailing edge. Therefore point P2 is located upstream of point P1.

This special geometry near the wicket gate trailing edge has not been applied in the hydro industry since it would normally result in higher dynamic loading on the wicket blades due to the resulting increased strength of von Kármán vortices. The inventors have realized that this problem can however be overcome since the flow of gas through the openings at the trailing edge is mitigating the formation of the vortices.

Figure 4:
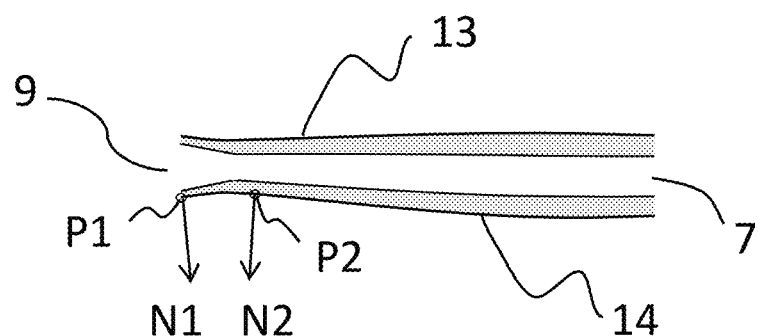
FIG. 4 is a cross-sectional view of a wicket gate blade according to a second embodiment of the present invention.

FIG. 4 shows a second embodiment of the present invention. The difference to the embodiment of FIG. 3 is that the pressure side surface 13 near the trailing edge is not straight as in FIG. 3 but concave.

Figure 5:
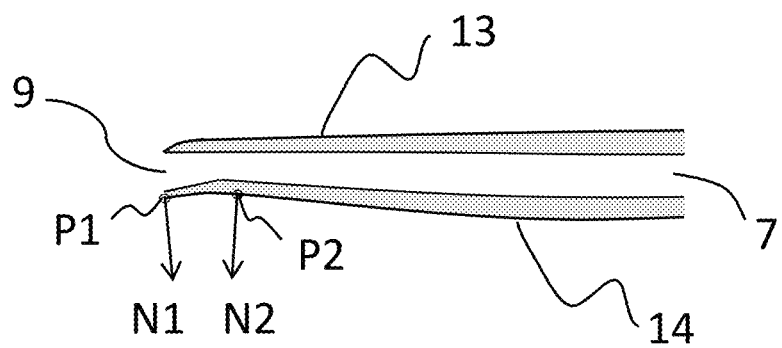
FIG. 5 is a cross-sectional view of a wicket gate blade according to a third embodiment of the present invention.

FIG. 5 shows third embodiment of the present invention. The difference to the embodiments of FIGS. 3 and 4 is that the pressure side surface 13 near the trailing edge is convex.

The inventors have realized that the positive effect of the invention increases, if the profile of the suction side surface 14 between the points P1 and P2 is concave and the angle between the normal vectors N1 and N2 is at least 2 degrees. Because the profile between P1 and P2 is concave, it is clear that the vectors N1 and N2 are pointing towards each other.

Figure 3A:
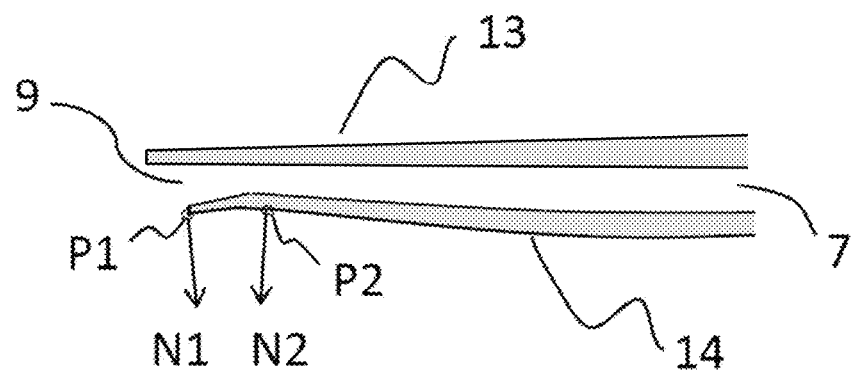
FIG. 3A is a cross-sectional view of a wicket gate blade according to another embodiment of the present invention.
Figure 4A:
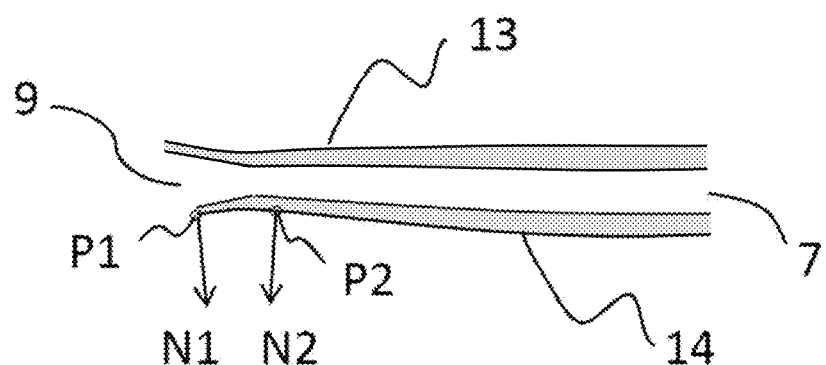
FIG. 4A is a cross-sectional view of a wicket gate blade according to a further embodiment of the present invention.
Figure 5A:
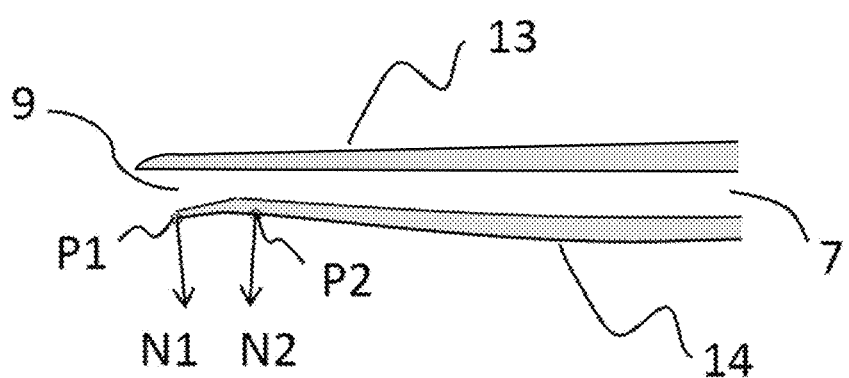
FIG. 5A is a cross-sectional view of a wicket gate blade according to another embodiment of the present invention.

The above-described embodiments of the present invention can be modified as illustrated in FIGS. 3A, 4A and 5A, such that, in the region of the air outlet aperture 9, the pressure side 13 of the wicket gate blade extends further than the suction side 14 in the direction to the trailing edge of the blade.

The invention claimed is:

1. A wicket gate for a hydraulic turbine or pump, the wicket gate comprising:
    a blade being defined by a pressure side surface, an oppositely facing suction side surface, a leading edge and a spaced apart trailing edge;
    a first trunnion;
    a second trunnion;
    said blade and one of said first and second trunnions having an air passage with an air inlet aperture and air outlet apertures formed therein, wherein said air passage is connected with said air inlet aperture and said air outlet apertures in a way that air can flow from said air inlet aperture through said air passage to each of said air outlet apertures and said air outlet apertures are disposed at said trailing edge of said blade; and
    said suction side surface of said blade having a profile along a cross section through a point P1 and a point P2 being concave, whereas the point P1 is disposed on said suction side surface of said trailing edge, directly at said trailing edge where one of said air outlet apertures is disposed, and the point P2 is spaced apart from the point P1 by less than 10% of a wicket gate length L and the point P2 is disposed upstream of the point P1 on a line perpendicular to said trailing edge starting at the point P1, and an angle between a first normal vector on said suction side surface N1 disposed at the point P1 and a second normal vector on said suction side surface N2 disposed at the point P2 being at least 2 degrees.

2. The wicket gate according to claim 1, wherein said air inlet aperture is formed in said first trunnion.

3. The wicket gate according to claim 1, wherein said air inlet aperture is formed in said second trunnion.

4. A wicket gate for a hydraulic turbine or pump, the wicket gate comprising:
    a blade being defined by a pressure side surface, an oppositely facing suction side surface, a leading edge and a spaced apart trailing edge;
    a first trunnion;
    a second trunnion;
    said blade and one of said first and second trunnions having an air passage with an air inlet aperture and air outlet apertures formed therein, wherein said air passage is connected with said air inlet aperture and said air outlet apertures in a way that air can flow from said air inlet aperture through said air passage to each of said air outlet apertures and said air outlet apertures are disposed at said trailing edge of said blade, in a region of said air outlet apertures said pressure side surface being extended further than said suction side surface in the direction of the trailing edge of the blade; and
    said suction side surface of said blade having a profile along a cross section through a point P1 and a point P2 being concave, whereas the point P1 is disposed on said suction side surface of said trailing edge, directly at said trailing edge where one of said air outlet apertures is disposed, and the point P2 is spaced apart from the point P1 by less than 10% of a wicket gate length L and the point P2 is disposed upstream of the point P1 on a line perpendicular to said trailing edge starting at the point P1.

* * * * *